United States Patent [19]
de Beeck et al.

[11] Patent Number: 5,985,503
[45] Date of Patent: Nov. 16, 1999

[54] ELECTROSTATOGRAPHIC METHOD FOR THE PRODUCTION OF TRANSFER IMAGES

[75] Inventors: Werner Op de Beeck, Keerbergen; Eddie Daems, Herentals; Freddy Ducheyne, Wommelgem; Marc Boets, Edegem, all of Belgium

[73] Assignee: Agfa-Gevaert, N.V., Mortsel, Belgium

[21] Appl. No.: 09/026,125

[22] Filed: Feb. 19, 1998

Related U.S. Application Data

[60] Provisional application No. 60/045,087, Apr. 29, 1997.

[30] Foreign Application Priority Data

Mar. 11, 1997 [EP] European Pat. Off. .............. 97200721

[51] Int. Cl.$^6$ .................................................. G03G 13/20
[52] U.S. Cl. ............................. 430/124; 430/126
[58] Field of Search .................... 430/124, 126, 430/109, 47; 399/308

[56] References Cited

U.S. PATENT DOCUMENTS

| | | |
|---|---|---|
| 4,064,285 | 12/1977 | Mammino . |
| 4,066,802 | 1/1978 | Clemens . |
| 4,216,283 | 8/1980 | Cooper et al. . |

FOREIGN PATENT DOCUMENTS

| | | |
|---|---|---|
| 0 415 701 | 3/1991 | European Pat. Off. . |
| 0 453 256 | 10/1991 | European Pat. Off. . |
| 0 466 503 | 1/1992 | European Pat. Off. . |
| 0 712 881 | 5/1996 | European Pat. Off. . |
| 27 27 223 | 12/1978 | Germany . |
| 39 43 556 | 11/1991 | Germany . |
| 2 273 466 | 6/1994 | United Kingdom . |
| 2 300 384 | 11/1996 | United Kingdom . |
| wo 90/13063 | 11/1990 | WIPO . |
| Wo 95/00883 | 1/1995 | WIPO . |

*Primary Examiner*—Christopher D. Rodee
*Attorney, Agent, or Firm*—Breiner & Breiner

[57] ABSTRACT

A process for electrostatographic production of a transfer image on a transfer foil, useful for hot-stamping is disclosed. The process uses transfer foils with a thickness between 5 and 60 $\mu$m and the image is printed on the transfer foil using toner particles with a melt viscosity between 100 and 2,000 Pa·s. The image is preferably fixed to the transfer foil by non-contact fusing methods and the printing proceeds on a web unwound from a roll.

9 Claims, No Drawings

ELECTROSTATOGRAPHIC METHOD FOR THE PRODUCTION OF TRANSFER IMAGES

This application claims benefit of provisional application 06/045,087, filed Apr. 29, 1997.

DESCRIPTION

1. Field of the Invention

This invention relates to an electrostatographic process for the production of images on transfer foils that can be transferred to other substrates by the process of hot-stamping or in-mould decoration.

2. Background of the Invention

Decoration of objects by hot-stamping or in mould decoration proceeds by applying, under pressure and/or heat, a foil carrying a coloured layer that is transferable by heat and pressure. In many applications the foil carries a uniform coloured layer. The object is the decorated by pressing the foil against the object with an image bearing stamper. This latter kind of process creates a lot of wasted colour since only a small part of the coloured layer is transferred.

Printing colour images on transfer foils by electrostatographic means is well known in the art. The advantage of electrostatographic methods, for making such images, over traditional printing techniques (offset, screen-printing, etc) is the simplicity of the electrostatographic system, the price and, when using dry electrostatic printing, the fact that the preparation of such transfer foils can be used with very little impact on the environment. Moreover the electrostatographic methods make it possible to make transfer images in small edition and even to personalize the images. Also the fact that electrostatographic imaging methods are often digital printing method present an advantage over the printing methods that are traditionally used for making images transferable by hot stamping or in-mould decoration.

In DE-A 27 27 223 a method for transferring images onto cotton T-shirts by first producing an electrostatic latent image in a known manner on an intermediate substrate, coating the latent image with thermoplastics toner, reversing the polarity of charge to transfer the toner image to a second intermediate substrate coated on both sides with a layer (preferably of polyethylene) and a thermoplastics clear lacquer layer adjacent the toner image. The toner image fixed on the substrate is transferred to the T-shirt by application of heat and pressure.

In U.S. Pat. No. 4,066,802 xerographic means to produce transfer images, mainly for transfer on fabrics are disclosed. Although the main interest of this disclosure is the decoration of fabrics, it is disclosed that the pictures may be transferred to other substrates e.g. glass, metal, synthetic and natural materials.

In U.S. Pat. No. 4,064,285 a printing process in which an image is formed in toner powder by a xerographic method and transferred to a subbing layer on a release material carried by a substrate in sheet form. The image is then heated in contact with a fabric, wood or polymeric material and the substrate coated with release material is removed. The subbing layer is a low-melting polymer selected from vinyl or vinylidene chloride, vinyl acetate, methyl-, ethyl- or butylmethacrylate or their mixtures or copolymers. The release material is a silicon or fluorinated polymer and the substrate is preferably paper. The process of this disclosure is used to print individual pictures, letters, words, etc. on fabrics, garments, household articles, furniture etc. Materials can be decorated with personalized images in full colour at low cost by a simple process using known xerographic methods and equipment. The images of this disclosure are said to be permanent, adhere well and flexible.

In JP-A 63/296,982 an electrostatographic method for producing coloured transfer images for transfer onto any material, e.g., thick paper, ultra thin paper, film, acrylic plate, metal plate, etc. The system is said to be less costly than conventional transfer lettering. However the method uses two foils, a first one whereon an electrostatographic transfer image is printed, the transfer image is then transferred to a second (thin) foil and this foil is used to decorate the object.

In U.S. Pat. No. 4,216,283 a xerographic process comprises first depositing an electrostatic image, xerographically, onto a master dry transfer carrier sheet which is adhesive with respect to the developed image. The electrostatic image is developed with a dry toner composition containing a thermoplastic agent, to give an image which is pressure-transferable to a receptor surface. The top surface of the developed image is then contacted with the receptor surface and pressure is applied to the non-image-bearing side of the carrier sheet to transfer the image to the receptor surface. Transfer sheets bearing the required symbols can be made as and when required, and transferred to a wide variety of substrates in the usual way by pressure on the back of the transfer sheet.

In EP-A 466 503, an image carrier sheet fore use in image transfer processes is disclosed. The sheet has a flexible web base carrying in order (1) a surface layer of polymeric material, and (2) a thermoplastic coating which is receptive to toner. A toner image is formed xerographically on the thermoplastic coating. The sheet carrying the image is then assembled with a receiving substrate of textile material and subjected to heat and pressure. The thermoplastic coating separates from the polymeric surface layer so that the toner image transfers to the textile substrate, wetting the substrate and flowing into intimate contact with the fibres. The disclosure is interested especially in a transfer method for printing T-shirts. The image on the transfer sheet may be semi-permanent enabling the sheet to be handled without damaging the image.

In WO 90/13063 a method of pattern transfer has the pattern reproduced from an original by an electrostatic or preferably a digital laser photocopier onto a transfer sheet is then juxtaposed to an adhesive, moulding or lacquer layer covering the foil. The transfer sheet is peeled off and the dry toner particles are pressed onto the outside or inside of a display window or similar image carrier, which is not necessarily plain. The method is said to be useful for the production of simple textiles, plastics, and ceramics similar artefacts, producing fast and sharp decoration on highly curved surfaces without recourse to harmful solvents.

In DE-C 39 43 556 a method of pattern transfer is disclosed having the pattern reproduced from an original by an electrostatic or preferably a digital laser photocopier onto a transfer sheet. The pattern is then juxtaposed to an adhesive, moulding or lacquer layer covering the foil. The transfer sheet is peeled off and the dry toner particles are pressed onto the outside or inside of a display window or similar image carrier, which is not necessarily plain. The method is said to be very suitable for decoration of simple textiles, plastics, and ceramics similar artefacts. The method is said to produce fast and sharp decoration on highly curved surfaces without recourse to harmful solvents.

The methods, referred to above, do make it possible to electrostatographically produce transfer image, but most (if not all) of the methods produce the transfer image on a fairly thick base, and some methods are disclosed as restricted to the use of paper as support for the transfer sheet.

Nowadays, transfer sheets, for hot-stamping or in mould decoration, produced by classical printing (screen printing, gravure printing, offset printing) are produced on fairly thin plastic supports. It showed that the electrostatographic methods disclosed above did not yield optimum results when using very thin transfer sheets, e.g. in JP-A 63/296,982, cited above, the image is electrostatographically formed on a thick sheet and then transferred to a thin sheet to be used in the final transfer. Thus there is still a need for an electrostatographic method for the producing of transfer images on very thin supports.

OBJECTS AND SUMMARY OF THE INVENTION

It is an object of the invention to provide an economical process for making transfer images for decorating objects making it possible to decorate small editions of objects and to make personalized decoration.

It is a further object of the invention to provide a process for making transfer images that require only moderate heating for adequate transfer.

It is still an other object of the invention to provide a dry process for making transfer images on very thin substrates.

It is a further object of the present invention to provide master images which generate a low amount of waste after transferring.

The objects of the invention are realized by providing an electrostatographic process for producing a transfer image on a substrate suitable for hot-stamping transfer and in-mould decoration, comprising the steps of:

i) feeding a substrate though a digital electrostatographic printing system by unwinding said substrate as a web from a roll, said substrate being between 5 and 60 $\mu$m thick and having a first and second major face, said first major face having release properties, ii) forming a toner image by electrostatograhically image-wise depositing toner particles, containing a toner resin and a and having a melt viscosity between 100 and 2,000 Pa·s, on said first major face, and iii) fixing said toner image, under application of at most 1 g/m$^2$ of external release agent, to said first major face, so as to have a releasible toner image on said substrate.

In a preferred embodiment the fixing proceeds in non contact mode and no release agent is applied to the image.

DETAILED DESCRIPTION OF THE INVENTION

Transfer images being transferable by a hot-stamping process or in-mould decoration and printed on a transfer foil having a thickness between 5 and 60 $\mu$m, require less heat during transfer than transfer images printed on thicker foils. The use of such thin foils is not obvious in classical electrostatographic systems that use printing stock in sheet form. These thin foils in sheet form wrinkle in the machine, give rise to jamming, etc. making these foils almost unusable in an electrostatographic printing system for sheet printing. This problem of handling sheets can be circumvented by e.g. attaching the thin foil to a thick leader foil before entering it to the printing system, but this is a costly complication of the system. The best way to print on such thin foils (i.e. having a thickness between 5 and 60 $\mu$m), is printing them in an electrostatographic printing system capable of printing on web, unwound from a roll. Such electrostatographic printing systems are available in the market place e.g. from Agfa Gevaert NV, Mortsel, Belgium under trade CHROMAPRESS or from Xeikon NV, Mortsel Belgium under trade name DCP1.

It was further found that electrostatographically formed transfer images could be transferred using less heat and surprisingly would adhere better to the substrate to which they were transferred when toner particles were used that have a melt viscosity at 120° C. between 100 and 2,000 Pa·s, preferably between 100 and 1,000 Pa·s. The melt viscosities (in fact complex viscosities) mentioned herein are measured in a CLS$^2$ RHEOMETER, (trade name of TA Instruments, 109 Lukens Drive, New Castle, Del. 19720 USA). The viscosity measurement is carried out at a sample temperature of 120° C. The sample having a weight of 0.75 g is applied in the measuring gap (about 1.5 mm) between two parallel plates of 20 mm diameter one of which is oscillating about its vertical axis at 100 rad/sec and amplitude of 10$^{-3}$ radians. It was further found to be very beneficial, in a process according to this invention, to use toner having an elasticity, expressed as $(tg\delta)^{-1}$, >0.1 more preferably >0.25. This $(tg\delta)^{-1}$ is measured in the same rheometer as the melt viscosities and is the ratio between the elastic (storage) modulus and the viscosity (loss) modulus.

It was further found that it was necessary, for printing transfer images that adhere well to the substrate to which they were transferred, to use a fixing system, for fixing the toner particles to the transfer foil, that applies at most 1 g of external release agent (e.g. silicone oils) per m$^2$, preferably at most 0.5 g/m$^2$. Even more preferably, in the process according to this invention, is the use of a fixing system applying no external release agent to the image to be transferred. Thus hot-roller fixing systems can be used in a process according to this invention, as long as they dispense only a fairly low amount of release agent to the toner image that is fixed. However, since toner particles having low melt viscosity are preferably used in the process according to the present invention, the risk for hot-offset (i.e. the adherence of toner particles to the hot fixing roller) is quite high when using hot-roller fixing systems dispensing a low amount of release agent or no release agent at all. Therefore it is preferred to use a non-contact fixing step in the process according to this invention and more preferably a fixing method comprising IR (InfraRed) radiation, optionally combined with hot air, to fix the image.

Electrostatic printing methods are manifold, e.g. Direct Electrostatic Printing, wherein electrostatic printing is performed directly from a toner delivery means on a receiving substrate, the latter not bearing any imagewise latent electrostatic image, by means of an electronically addressable printhead structure.

In another form of electrostatic printing toner images are made on an image-forming element in the form of a rotating drum provided with an electrostatic layer built up from a number of controllable electrodes in and beneath a dielectric layer. The voltage that is image-wise applied to said controllable electrodes attracts charged toner particles from a toner source.

It is also well known in the art of electrographic printing and electrophotographic copying to form an electrostatic latent image corresponding to either the original to be copied, or corresponding to digitized data describing an electronically available image.

In electrophotography an electrostatic latent image is formed by the steps of uniformly charging a photoconductive member and imagewise discharging it by an imagewise modulated photo-exposure.

In electrography an electrostatic latent image is formed by imagewise depositing electrically charged particles, e.g. from electron beam or ionized gas onto a dielectric substrate.

The obtained latent images are developed, i.e. converted into visible images by selectively depositing thereon light absorbing particles, called toner particles, which usually are triboelectrically charged.

All electrostatographic printing methods, mentioned immediately above, can be used in the process according to this invention, as long as the methods are incorporated in a printer making it possible to print on a printing stock in web form, unwound from a roll.

The Transfer Foil

Any transfer foil, known in the art and having a thickness between 5 and 60 μm can be used in the process according to this invention.

Preferably the transfer foil comprises a plastic (synthetic polymer) support, e.g. polyester (polyethyleneterephthalate, polyethylenenaphthalate, etc.), syndiotactic polystyrene, polypropylene, etc. When a plastic support is used it is preferred to use a thermoset polymeric foil, since during the fusing of the toner image to the transfer foil, a quite high temperature can be reached. This high temperature entails the risk of wrinkling or wrapping up of the foil when the foil is not thermoset. A transfer foil comprising a thermoset support has also the advantage that it does not undergo large dimensional changes during the fusing step.

The transfer foil can comprise a release layer at the face of the foil whereon the toner particles are adhered. The release layer can be any release layer known in the art, e.g. it can comprise polysiloxanes, waxes, fatty alcohols, fatty acids, fatty acid esters, an hydroalkylcellulose compound in which alkyl stay for a C1 to C6 alkylgroup, a polyvinylalcohol/polyvinylacetate mixture, etc. The thickness of such a release layer is in the range of 0.1 to 4 μm, preferably in the range between 0.5 and 2 μm. The toner particles, can in a process of the present invention, be directly deposited and fixed on said release layer.

On top of the release layer further layers may be present, e.g. a thermoadhesive layer, a protective layer, etc. The toner particles are then deposited and fixed on the addional layers. The presence of additional layers, especially of a protective layer, on top of the release layer is most beneficial in transfer foils that will be used to decorate objects that are expose to physical strain, e.g. object that have to be wear resistant, weatherable, etc. Typical useful protective layers are e.g. layers comprising nitrocellulose, nitrocellulose cured with isocyanates, polymetylmethacrylate, radiation (e.g. ultraviolet or electron beam) curable compounds, etc. On top of such a protective layer a thermoadhesive layer can be present, assuring a good adhesion of the transferred image on the object to be decorated. The additional layers on top of the release layer are stripable layers and during transfer the stripable layers are transferred in their totality or image-wise together with the toner image. The release layers remains generaly on the support.

Toner Particles

The toner particles and the developer used in the process according to the present invention can be of any known type mono-component non-magnetic toner particles, mono-component magnetic toner particles, multi component developers comprising non-magnetic toner particles and magnetic carrier particles. Preferably non-magnetic toner particles are used, since the presence of magnetic pigment in coloured toner particles deteriorates the hue of the colour.

The toner particles, for use in the process of this invention as disclosed above, have preferably a melt viscosity at 120° C. between 100 and 2,000 Pa·s, more preferably between 100 and 1,000 Pa·s. The toner particles comprise therefore preferably a toner resin, alone or in a mixture, as tabulated in table 1.

TABLE 1

| Polymer | Tg °C. | Melt† Pa.s | $M_w$ | $M_n$ |
|---|---|---|---|---|
| Polyester P1 | 50,5 | 180 | 14,000 | 4,500 |
| Polyester P2 | 65 | 550 | 11,500 | 3,700 |
| Polyester P3 | 63 | 700 | 16,000 | 3,500 |
| Polyester P4 | 69 | 1600 | 25,500 | 7,100 |
| Styr/acryl S1 | 67 | 1700 | 33,000 | 13,000 |
| Styr/acryl S2 | 68 | 285 | 6,500 | 2,000 |
| Styr/acryl S3 | 78 | 170 | 19,000 | 7,000 |
| Styr/acryl S4 | 79 | 290 | 24,000 | 9,000 |
| Styr/acryl S5 | 79.5 | 698 | 36,000 | 13,500 |
| Styr/acryl S6 | 79 | 2252 | 60,500 | 23,000 |

†melt viscosity in Pa.s
Polyester P1 is ATLAC T500 (tradename).
Polyester P2 is an aromatic polyester resin derived from terephthalic acid (100 mol %) as aromatic diacid and a mixture of DIANOL 33 (50 mol %) and ethylene glycol (50 mol %) as diols.
Polyester P3 is an aromatic polyester resin derived from terephthalic acid (40 mol %), isophthalic acid (60 mol %) as aromatic di-acids and a mixture of DIANOL 22 (40 mol %) and ethylene glycol (60 mol %).
Polyester P4 is an aromatic polyester resin derived from terephthalic acid (64 mol %), isophthalic acid (36 mol %) as aromatic di-acids and ethylene glycol (100 mol %).
DIANOL 22 is di-ethoxylated Bisphenol A.
DIANOL 33 is di-propoxylated Bisphenol A.
Bisphenol A = 4,4'isopropylidenediphenol.
Styr/acryl S1 is a copolymer of styrene and methyol acrylate in a 65/35 molar ratio.
Styr/acryl S2 is a terpolymer of styrene, methyl acrylate and dimethylaminoethyl methacrylate in a 87/3/10 molar ratio.
Styr/acryl S3, S4, S5 and S6 are a copolymer of styrene and methyl acrylate in a 80/20 molar ratio, only differing in molecular weight. Since the melt viscosity of polymer S6 is higher than 2,000 Pa.s this resin is preferably only used in a mixture with one or more resins having a lower melt viscosity.

It is preferred that the toner particles for use in the present invention have also a narrow melting range of at most 15° C. Therefore, the toner resin is preferably an amorphous complex macromolecular compound that comprises in its macromolecular structure, (i) an amorphous polycondensation backbone, the corresponding backbone polymer (A) having a Tg of at least 45° C. and (ii) at least one polymer chain (B) being attached to said backbone, either terminally and/or in a side-chain, said polymer chain (B) being derived from a polymer which on itself has an average molecular weight by number ($M_{avg}$) so that $400 \leq M_{avg} \leq 4,000$, a melting point between 50° C. and 150° C. and a melting range of at most 15° C. Such an amorphous polymeric compound can be prepared by modifying amorphous polycondensation polymers in a simple way to provide basically amorphous macromolecules, comprising crystalline or crystallizable moieties. The chemical reaction takes basically place between reactive groups comprised in said amorphous polycondensation polymer and a reactive group comprised in the monofunctional crystalline or crystallizable polymers that will be attached (grafted) to the backbone. Preferably the amorphous polymer to be modified is a polyester having an acid value or an hydroxyl value between 5 and 50 mg KOH per g of polyester. Most preferred are polyesters with an acid value or hydroxyl value between 10 and 30 mg KOH per g of polyester. The polyester is preferably modified by reaction with polyolefinic monoalcohols, commercially available as UNILIN 425, UNILIN 550, UNILIN 700, UNILIN 1000 and UNILIN 2000 (tradenames of PETROLITE, 6910 East 14th street, TULSA, Okla. 74112, USA for polyolefinic alcohols with average molecular weight of 425, 700, 1,000 and 2,000 respectively), or UNITHOX 720, a tradename for a hydroxyterminated, polyolefinicpolyoxyethylenic macromolecule, with average molecular weight of 875 of the same PETROLITE company. A typical example of a monofunctional carboxyl terminated polyolefine is UNICID 700 a tradename of PETROLITE for a polyolefinic monocarboxylic acid with average molecular weight of 700. Such modified amorphous polymeric molecules have been disclosed in EP-A 712 881. A typical useful polymer for toner particles used in the process of this invention is prepared by mixing 80 parts of an amorphous linear polyester of propoxylated bisphenol A and fumaric acid (ATLAC T500, a tradename of Atlas Chemical Industries Inc. Wilmington, Del. U.S.A.), having an acid value of 25 mg KOH/g and Tg of 52° C., in a glass reactor, with 20 parts of UNILIN 700 (tradename of PETROLITE, 6910 East 14th street, TULSA, Okla. 74112, USA), a monofunctional polyolefinic molecule, consisting of $-CH_2-CH_2-$ groups terminated at one side with a $-CH_3$ group and at the other by a HO-group, having an average molecular weight of 700, and a melting point of 110° C.

The toner resin used in toner particles, useful in a process according to this invention, has preferably an acid value (AV) and/or a hydroxyl value (HR) equal to or larger than 3 mg KOH/g of resin, more preferably said AV and/or HV is equal to or larger than 7 mg KOH/g of resin.

Toners for the production of colour images may contain organic colorants that may be dyes, soluble in the binder resin or pigments including mixtures thereof. Particularly useful organic colorants are selected from the group consisting of phthalocyanine dyes, quinacridone dyes, triaryl methane dyes, sulphur dyes, acridine dyes, azo dyes and fluoresceine dyes. A review of these dyes can be found in "Organic Chemistry" by Paul Karrer, Elsevier Publishing Company, Inc. New York, U.S.A (1950).

Likewise may be used the dyestuffs described in EP-A 384 040, EP-A 393 252, EP-A 400 706, EP-A 384 990, and EP-A 394 563.

Toner particles for use in a process according to this invention can comprise any colouring agent (dyes or pigments) known in the art. Since the toner image is transferred by heat, it is preferred that the toner particles comprise a dye or pigment that does not change colour or fade upon heating (i.e. a heat-resistant day or pigment). Preferably pigments are chosen that can resist temperatures up to 300° C. without excessive fading or colour deterioration.

The toner particles useful in the present invention are prepared by mixing the above defined binder and ingredients in the melt phase, e.g. using a kneader. After cooling the solidified mass is crushed, e.g. in a hammer mill and the obtained coarse particles further broken e.g. by a jet mill to obtain sufficiently small particles from which a desired fraction can be separated by sieving, wind sifting, cyclone separation or other classifying technique. The actually used toner particles have preferably an average diameter between 3 and 20 µm determined versus their average volume, more preferably between 5 and 10 µm when measured with a COULTER COUNTER (registered trade mark) Model MULTISIZER particle size analyzer operating according to the principles of electrolyte displacement in narrow aperture and marketed by COULTER ELECTRONICS Corp. Northwell Drive, Luton, Bedfordshire, LC UK. Suitable milling and air classification may be obtained when employing a combination apparatus such as the Alpine Fliessbeth-Gegenstrahlmühle (A.G.F.) type 100 as milling means and the Alpine Turboplex Windsichter (A.T.P.) type 50 G.C as air classification means, available from Alpine Process Technology, Ltd., Rivington Road, Whitehouse, Industrial Estate, Runcorn, Cheshire, UK. Another useful apparatus for said purpose is the Alpine Multiplex Zick-Zack Sichter also available from the last mentioned company.

The process according to the present invention is preferably implemented in a printer wherein the substrate can be fed as a web unwound from a roll, and wherein the printing proceeds from digital image data (image is in this document text as well as pictures) that are fed to the printing engine.

The use of a digital printing press that is equipped for duplex printing in one pass of the printing stock is preferred, since it is possible, in such a printing press to pass two webs simultaneously in a back to back position to such a printing press and obtain two webs, each printed on one side, in a single pass.

We claim:

1. An electrostatographic process for producing a transfer image on a substrate suitable for hot-stamping transfer and in-mould decoration, comprising the steps of:

i) feeding a substrate through a digital electrostatographic printing system by unwinding said substrate from a roll and passing it through said printing system in web form, said substrate being between 5 and 60 µm thick and having a first and second major face, said first major face having release properties, ii) forming a toner image by electrostatograhically imagewise depositing toner particles, containing a toner resin and having a melt viscosity between 100 and 2,000 Pa·s, on said first major face, and iii) fixing said toner image, while applying at most 1 g/m² of release agent on top of said toner image, on said first major face, so as to have a releasable toner image on said substrate.

2. A process according to claim 1, wherein said toner particles have a melt viscosity between 100 and 1,000 Pa·s.

3. A process according to claim 2, wherein said fixing proceeds by non-contact fusing.

4. A process according to claim 3, wherein said non-contact fusing comprises IR-radiation.

5. A process according to claim 1, wherein said toner particles have further an elasticity $((tg\delta)^{-1})>0.1$.

6. A process according to claim 1, wherein said toner resin has a acid value or an hydroxyl value equal to or larger than 3 mg KOH/g of resin.

7. A process according to claim 1, wherein said toner resin is an amorphous complex macromolecular compound that comprises in its macromolecular structure, (i) an amorphous polycondensation backbone, the corresponding backbone polymer (A) having a Tg of at least 45° C. and (ii) at least one polymer chain (B) being attached to said backbone, either terminally and/or in a side-chain, said polymer chain (B) being derived from a polymer which on itself has an average molecular weight by number ($M_{avg}$) so that $400 \leq M_{avg} \leq 4{,}000$, a melting point between 50° C. and 150° C. and a melting range of at most 15° C.

8. A process according to claim 1, wherein said transfer foil comprises a polysiloxane compound on said first face, giving release properties to said first face.

9. A process according to claim 8, wherein said transfer foil comprises a protective layer on top of said polysiloxane compound.

* * * * *